United States Patent [19]
Waldron

[11] 3,738,174
[45] June 12, 1973

[54] TEMPERATURE CALIBRATION SYSTEM

[75] Inventor: Bradley C. Waldron, Canoga Park, Calif.

[73] Assignee: King Nutronics Corporation, Van Nuys, Calif.

[22] Filed: Mar. 1, 1972

[21] Appl. No.: 230,768

[52] U.S. Cl. .............................. 73/362 AR, 73/1 F
[51] Int. Cl. ....................... G01k 7/24, G01k 15/00
[58] Field of Search ...................... 73/1 F, 362 AR

[56] References Cited
UNITED STATES PATENTS

| | | | |
|---|---|---|---|
| 2,535,083 | 12/1950 | Martin | 73/1 F |
| 2,971,379 | 2/1961 | Weisheit | 73/362 AR |
| 3,440,883 | 4/1969 | Lightner | 73/362 SC |
| 3,695,112 | 10/1972 | Possell | 73/362 AR |
| 3,699,800 | 10/1972 | Waldron | 73/1 F |

FOREIGN PATENTS OR APPLICATIONS

| | | | |
|---|---|---|---|
| 863,896 | 3/1961 | Great Britain | 73/362 AR |

Primary Examiner—Richard C. Quiesser
Assistant Examiner—Frederick Shoon
Attorney—Ford W. Harris, Jr., Warren L. Kern, Donald C. Russell

[57] ABSTRACT

A temperature calibration system including a well for receiving a temperature sensor such as a thermometer or thermocouple, and a heater for heating the well to a desired and adjustable temperature. A single well instrument providing a temperature range of 100° to 600° F. in five steps. A temperature measuring circuit for indicating the temperature of the well and including a temperature sensing element, a temperature signal amplifier, an indicating meter and series diode, and a meter zero reference amplifier, with circuitry for providing substantially linear operation with nonlinear components.

7 Claims, 4 Drawing Figures

TEMPERATURE CALIBRATION SYSTEM

This invention relates to dry well temperature test systems and to systems particularly designed for on site testing and calibration of temperature sensitive devices such as thermocouples, thermoswitches, thermistors, temperature control systems, and temperature indicators. The system of the invention is particularly well suited for use with remote indicating controls in instrumentation systems. A system of this general type is disclosed in my copending application Ser. No. 120,818, filed Mar. 4, 1971, entitled TEMPERATURE CALIBRATION SYSTEM, assigned to the same assignee as this application, and now U.S. Pat. No. 3,699,800, issued Oct. 24, 1972. The system of the present application incorporates a number of improvements over the system of the copending application.

The apparatus of the invention incorporates an electrically heated, dry temperature well, thereby eliminating the molten salt and hot oil baths of conventional devices and the attendant dangers and limitations on operating locations, operating positions and portability. The apparatus of the present invention utilizes a single well rather than a plurality of wells, while providing operation over an extended temperature range of 100° to 600° F. The apparatus of the invention provides for coverage of the overall temperature range in a few relatively large steps, typically five steps of 100° F. each. The new apparatus provides for a fast warm-up, stable operation, and ease of setting of the well temperature. The apparatus also provides a highly accurate direct read-out of temperature. These advantages and improvements in performance are achieved with new and improved circuitry as will be described hereinbelow. A particular feature of the system of the invention is the linear operation of the temperature read-out system while utilizing nonlinear components having different nonlinear characteristics.

Other objects, advantages, features and results will more fully appear in the course of the following description. The drawings merely show and the description merely describes a preferred embodiment of the present invention which is given by way of illustration or example.

Figure 3:
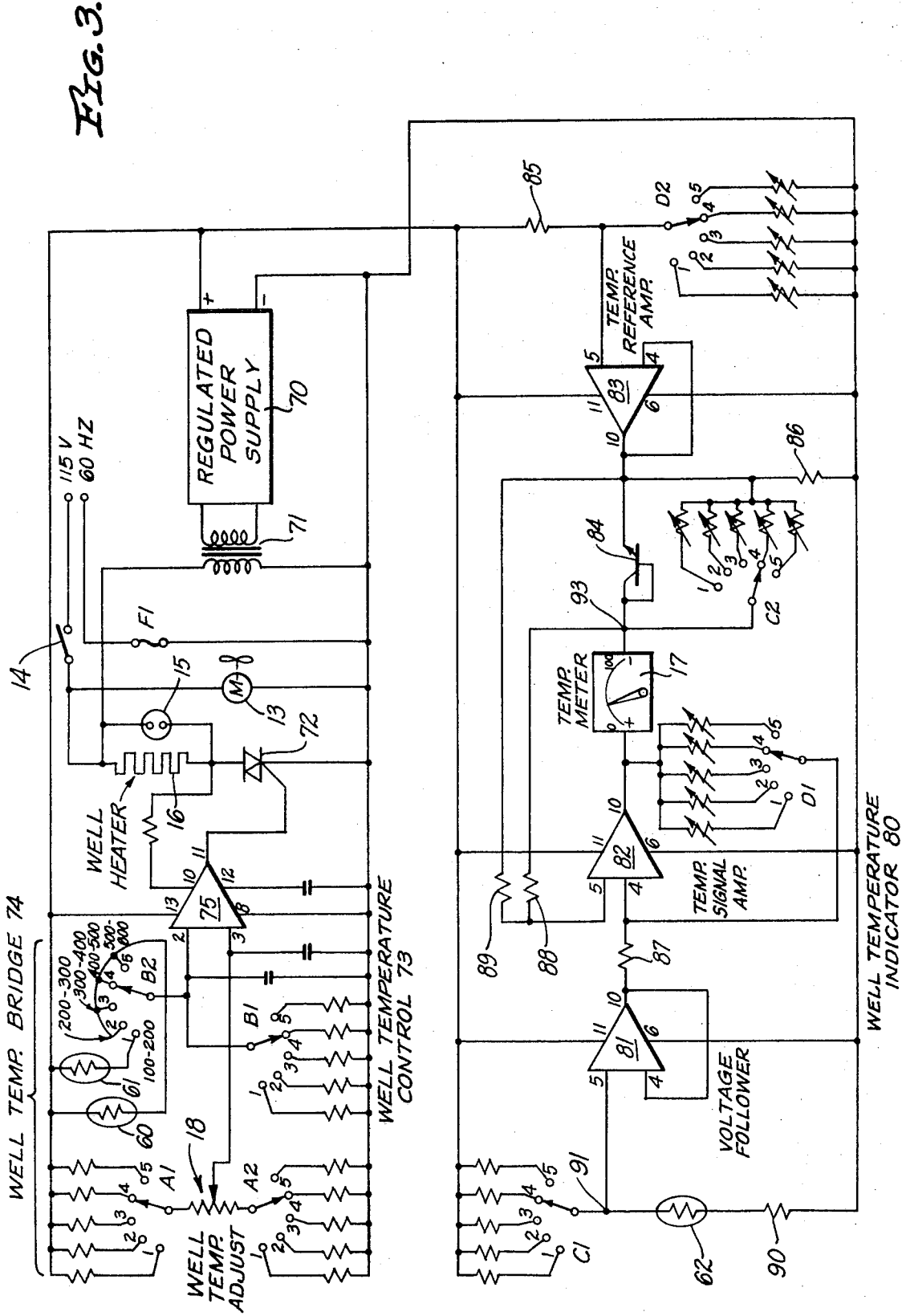
FIG. 3 is an electrical schematic of the instrument of FIG. 1.

The instrument shown in the drawings includes a housing 10 with the cover removed. A panel 11 is carried within the housing and supports the components of the system within the housing. Perforated plates 12 at each side of the panel 11 provide for air flow through the housing, produced by a fan driven by a motor 13 (FIG. 3). An off-on switch 14 and an indicator light 15 are mounted in the panel 11, with the lamp 15 being energized when a resistance heater 16 is energized. A temperature indicating meter 17, a well temperature adjusting potentiometer 18 and a temperature range switch 19 are also mounted in the panel 11. The meter 17 preferably is one with a linear movement, that is there is a linear relation between current through the meter coil and needle motion. The potentiometer 18 typically is a multiturn potentiometer which provides temperature adjustment over a range of at least 100° F. The switch 19 is a multideck switch having five positions 1–5 and eight sections A1, A2, B1, B2, C1, C2, D1 and D2 (FIG. 3). The switch 19 provides for selection of the temperature range in which the instrument operates, with the range for each step shown at B2 in FIG. 3.

A temperature well 20 is also mounted in the panel 11. The well includes an outer cup 21 with a metal sleeve 41 positioned therein between a lower insulator block 42 and an upper insulator block 43. Fiber glass is provided in the space 44 between the blocks 42, 43. Lugs 46 are carried at the upper end of the cup 21 and attachment screws 47 pass through openings in the panel 11 and insulator block 14 into threaded openings in the lugs 46 attaching the well to the panel 11.

A thermal insulating cover is provided for the well, and typically may comprise blocks 50 of thermal insulating material carried in brackets 51 hinged in supports 52 carried on the panel 11. Semicircular openings may be provided at adjacent edges of the blocks 50 providing clearance for a thermometer or for wires to a thermocouple or the like. Bosses 53 on the brackets 51 provide for manual pivoting of the blocks for insertion and removal of heat sinks.

Figure 2:
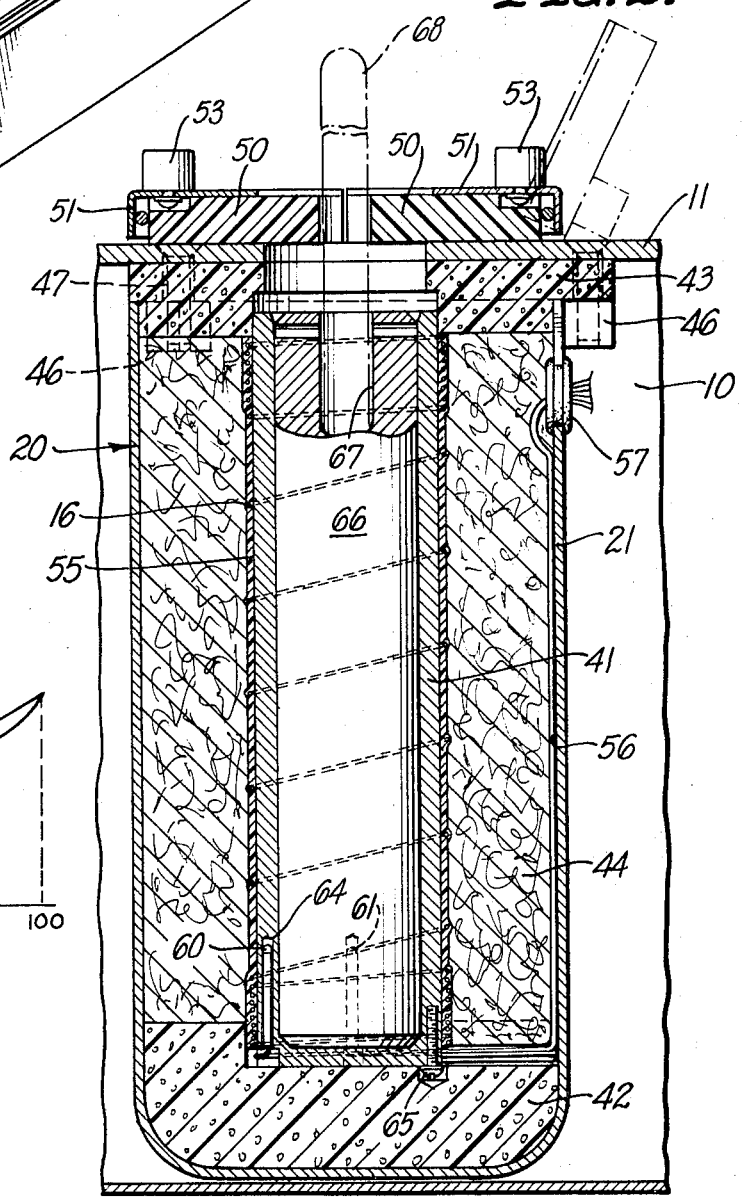
FIG. 2 is an enlarged partial sectional view taken along the line 2—2 of FIG. 1.

A layer of insulation 55 is wrapped on the metal sleeve 41 and the well heater 16 comprising a length of resistance wire, is wound on the sleeve over the insulation. Another layer of insulation may be applied over the heater winding. The conductors for the heater are incorporated in a cable 56 passing out of the well through a grommet 57 in the cup 21. Three temperature sensing elements, typically thermistors 60, 61, 62, are mounted in the sleever 41, two of the thermistors 60, 61, being shown in FIG. 2. Preferably, each thermistor is placed at the bottom of a hole 64 formed in the sleeve 41, with the conductors to each thermistor included in the cable 56. A ground conductor in the cable may be attached to the sleeve with a screw 65.

Figure 1:
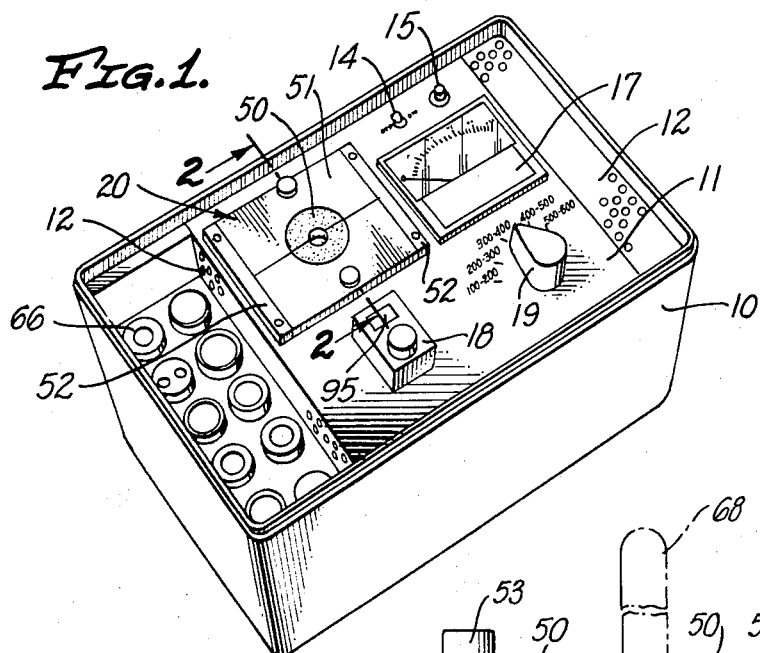
FIG. 1 is a perspective view of a portable dry well temperature test system incorporating a preferred embodiment of the present invention.

A heat sink 66 in the form of a metal tube is removably positioned within the cavity of the sleeve 41 and is designed to be a sliding fit within the cavity for good heat transfer characteristics. The bore 67 of the heat sink 66 is designed for receiving the temperature probe to be tested, such as a thermometer 68 indicated in phantom lines in FIG. 2. The bore of the heat sink may be tailored to each particular type of temperature sensor to be calibrated, with a plurality of heat sinks provided and being readily interchangeable in the well. The plurality of heat sinks with various bore configurations may be carried in the housing, as shown in FIG. 1.

The electrical circuitry for the instrument may be mounted below the panel 11 and provides a regulated power supply, a temperature control for the well, and a temperature read-out circuit for indicating the temperature of the well. A preferred electrical circuit for the instrument is illustrated in FIG. 3. The circuitry is powered from a 115 volt 60 Hertz supply and is turned on with the switch 14. A.C. power is provided to a conventional regulated power supply 70 via a transformer 71. A.C. power to the well heater 16 is controlled by a triac 72 connected in series with the heater, and the triac is controlled by the well temperature control unit 73.

The control unit 73 includes a well temperature bridge 74 and a zero crossing switch 75. The well temperature bridge 74 is a four-element bridge comprising one of the resistors selected by the switch section A1, one of the resistors selected by the switch section A2, one of the resistors selected by the switch section B1, and one of the thermistors 60, 61 selected by the switch section B2. The resistors of the sections A1 and A2 are connected across the D.C. power source, with the moving arm of the potentiometer 18 providing one input to the zero crossing switch 75. The thermistors and the resistors of the section B1 are connected across the power source, with the junction point of the switch sections B1, B2 providing the other input to the switch 75. The zero crossing switch may be a conventional circuit and typically is an integrated circuit such as a Fairchild μA742.

The well temperature indicator unit 80 includes a voltage follower 81, a temperature signal amplifier 82, a temperature reference amplifier 83, and a diode 84 which is connected in series with the meter 17 between the outputs of the amplifiers 82, 83. Each of the amplifiers 81, 82, 83 may be conventional in design and typically may be integrated circuits, such as Fairchild μA741. The amplifier 81 is operated as a voltage follower with a high input impedance. The amplifier 82 is operated as an operational amplifier. The amplifier 83 is operated as a unity gain amplifier which provides a constant output voltage independent of load.

The resistors of switch section D2 are connected in series with another resistor 85 across the power source to provide a reference input voltage for the amplifier 83. The resistors of switch section D1 provide a gain control for the amplifier 82. The resistors of switch section C2 provide an impedance in parallel with the diode 84 and are used in calibration of the read-out circuitry. Resistor 86 is an output load resistor for the amplifiers 82, 83. Resistor 87 is a coupling resistor between the amplifiers 81, 82. Resistor 88 provides a feedback path from the junction point 93 to the input of the amplifier 82, and resistor 89 provides a feedback path from the output of the amplifier 83. The resistors of switch section C1 are connected in series with the thermistor 62 and a resistor 90 across the voltage source, with the temperature signal for the read-out circuit appearing at the junction 91.

After the instrument has been initially calibrated in the manner to be described, it may be used to generate any temperature in the range 100° to 600° F. for the calibration and checking of temperature sensing devices. In operation, the switch 14 is closed and the switch 19 is turned to the desired range as indicated at B2, with all eight sections of the switch being ganged together. The temperatures adjustment potentiometer 18 may be provided with a numerical indicator 95 which can provide an approximate indication of the set temperature within the selected range. The heater 16 will be energized continuously and the light 15 will be on during the warm-up stage. Within a few minutes, the well will be up to the desired temperature and the power to the heater will be turned off and on several times a second for maintaining the well at the desired temperature. This may be visually observed by the flickering of the light 15. The resistance of the thermistor 60 or 61 varies with the temperature of the well and this variable resistance in the four-arm bridge provides the unbalance output signal for driving the zero crossing switch 75. The switch 75 functions to turn the triac 72 on and off at the zero crossing point of the A.C. power thereby reducing switching transients in the system.

The temperature of the well is indicated by the meter 17 which has a zero to 100 scale, with the zero point corresponding to the low point of the selected range and the 100 point corresponding to the high point of the selected range. The instrument as disclosed herein will provide an indicated temperature within an accuracy of ±2°. When a closer tolerance is desired, a standard sensor can be inserted in the well and the potentiometer 18 adjusted to provide the desired temperature on the standard, after which the setting of the potentiometer 18 is recorded. When a standard is used in the well, an accuracy of ±0.1° F. may be obtained with the instrument.

In the read-out circuit of the temperature indicating unit 80, the resistance of the thermistor 62 varies with the temperature of the well. This provides a temperature signal through the voltage follower 81 to the signal amplifier 82. The output from the temperature signal amplifier 82 is connected through the meter 17 (typically a 0–1 milliampere current meter) and the diode connected transistor 84 to the load resistor 86. The output of the reference amplifier 83 at the junction between the diode 84 and load resistor 86 is maintained substantially constant independent of the output of the signal amplifier 82.

Figure 4:
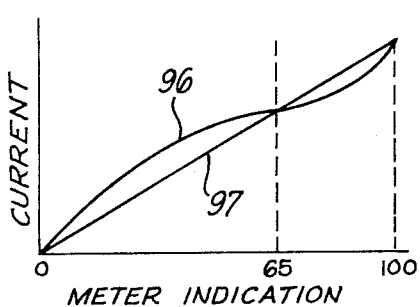
FIG. 4 illustrates certain linear and nonlinear characteristics of the instrument.

The variation in resistance of the thermistor 62 with change in temperature is a highly nonlinear relationship. This is partially compensated for by utilizing the diode rectifier element 84 in the signal amplifier output circuit, since the diode has a nonlinear characteristic also. However, it is exceedingly difficult to match the nonlinear characteristics of the two components and in the circuit of the present invention, this problem is substantially resolved by combining the nonlinear exponential curves of the thermistor 62 and diode 84 obtaining a double curve which is nearly a straight line. This double curve is shown at 96 in FIG. 4. The double curve 96 will have three points thereon which are in a straight line indicated at 97. The three points may occur at various locations along the meter range but it is preferred to have one point at zero meter position, one point at the full scale meter position, and one point intermediate, typically at the 65 meter position. With this controlled double curve and straight line relation, the scale on the meter can readily be made to match the double curve so that the meter indication can be read directly in temperature.

The read-out circuitry must be calibrated for these three meter positions for each range and the 400 to 500 range will be described as exemplary. The switch 19 is set to position 4 and the well temperature is adjusted to 400° using a known standard in the well. The variable resistor at switch section D2 is then adjusted until the meter reads exactly zero. The read-out circuit is then indicating exactly 400° and the temperature reference amplifier 83 is functioning to establish the zero indication point on the meter. The well temperature is then adjusted to 465° F. as indicated by the standard and the variable resistor in switch section C2 is adjusted to cause the meter to read 65, corresponding to an output indication of 465° F. Then the well temperature is increased to 500° as indicated by the standard, and the variable resistor for the switch section D1 is adjusted to cause the meter to indicate 100, corresponding to an indicated temperature of 500° F. This initial calibration normally is performed at the factory for each of the ranges, after which the temperature indicator may be utilized to read well temperature directly at any point between 100° and 600° F. with an accuracy of ± 2 percent, without requiring separate calibration at each temperature point of interest. The stability of the instrument can be improved if desired by placing some of the components, such as the diode 84 in a substantially constant temperature environment.

With the circuitry described, the range of 100°–600° F. can be covered in five 100° steps utilizing a single well and well temperature may be read directly at the meter. The instrument has a very fast warm-up time, rising to the desired temperature within a few minutes, and the desired temperature is readily adjusted by means of the potentiometer 18. After the desired temperature is reached, the instrument is highly stable and will maintain the set temperature within a degree or less.

While an exemplary embodiment of the invention has been disclosed and discussed, it will be understood that other applications of the invention are possible and that the embodiment disclosed may be subjected to various changes, modifications and substitutions without necessarily departing from the spirit of the invention.

I claim:

1. In a temperature measuring circuit for indicating temperature of a unit of a temperature calibration system or the like, the combination of:
    a temperature sensing element mounted in the unit, with the impedance of said element varying nonlinearly as a first function of temperature;
    first temperature signal amplifier means with a preset gain and having an input and an output and having a first variable resistor connected between said output and input for setting said gain;
    a meter for indicating temperature;
    a rectifier element having an impedance varying nonlinearly as a second function of voltage;
    a second variable resistor connected across said rectifier element;
    second temperature reference amplifier means having a present output maintained substantially constant with varying load;
    a third variable resistor connected to said second amplifier means for setting the output thereof;
    first circuit means connecting said temperature sensing element to said first amplifier means input; and
    second circuit means connecting said meter and rectifier element in series between the outputs of said first and second amplifier means;
    with said first, second and third resistors adjustable to define three points in a straight line in the temperature at said temperature sensing element versus current in said meter relation.

2. A temperature measuring circuit as defined in claim 1 including:
    a reference voltage source;
    a fourth resistor connected in series with said temperature sensing element across said source, with the junction of said resistor and element providing the input to said first amplifier means; and
    a fifth resistor connected in series with said third resistor across said source, with the junction of said resistors providing the input to said second amplifier means.

3. A temperature measuring circuit as defined in claim 1 wherein said meter has an output indication movement which is linear between a meter zero position and a meter full scale position, and
    wherein said third resistor is variable to set said zero position of said meter and said second resistor is variable to set a point intermediate said zero and full scale positions and said first resistor is variable to set said full scale position.

4. A temperature measuring circuit as defined in claim 1 including third circuit means connecting a feedback signal from the meter-rectifier element junction to the input of said first amplifier means.

5. A temperature measuring circuit as defined in claim 4 including fourth circuit means connecting a feedback signal from the output of said second amplifier means to the input of said first amplifier means.

6. A temperature measuring circuit as defined in claim 1 including:
    a reference voltage source;
    a plurality of fourth resistors; and
    a switch for selectively connecting each of said fourth resistors in series with said temperature sensing element across said source;
    with said first circuit means including a third voltage follower amplifier means having a high input impedance and connected between the junction of said resistor and element and said first amplifier means input.

7. A temperature measuring circuit as defined in claim 6 wherein each of said fourth resistors corresponds to a temperature range, and
    including a plurality of said first resistors,
    a plurality of said second resistors, and
    a plurality of said third resistors,
    with a separate first, second and third resistor for each of said fourth resistors, and
    with said switch including means for selecting one of each of said first, second and third resistors for each of the fourth resistors connected by said switch.

* * * * *